US011934143B2

(12) United States Patent
Itabashi

(10) Patent No.: US 11,934,143 B2
(45) **Date of Patent: *Mar. 19, 2024**

(54) DRUM CARTRIDGE INCLUDING MOVABLE ELECTRICAL CONTACT SURFACE, AND IMAGE-FORMING APPARATUS USING THE SAME

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,013

(22) Filed: Mar. 15, 2023

(65) Prior Publication Data

US 2023/0213888 A1 Jul. 6, 2023

Related U.S. Application Data

(63) Continuation of application No. 17/464,347, filed on Sep. 1, 2021, now Pat. No. 11,609,536, which is a (Continued)

(30) Foreign Application Priority Data

Aug. 30, 2019 (JP) ................................ 2019-158772

(51) Int. Cl.
*G03G 21/18* (2006.01)
*G03G 15/00* (2006.01)
(Continued)

(52) U.S. Cl.
CPC ..... *G03G 21/1867* (2013.01); *G03G 15/0865* (2013.01); *G03G 15/0867* (2013.01); (Continued)

(58) Field of Classification Search
CPC .......... G03G 15/0865; G03G 15/0867; G03G 15/80; G03G 21/1676; G03G 21/1814; (Continued)

(56) References Cited

U.S. PATENT DOCUMENTS 5,937,239 A 8/1999 Watanabe et al.
11,112,755 B2 * 9/2021 Itabashi ............ G03G 21/1867
(Continued)

FOREIGN PATENT DOCUMENTS

CN 206039150 U 3/2017
JP 9-179476 A 7/1997
(Continued)

OTHER PUBLICATIONS

Office Action (Notice of Reasons for Refusal) issued in corresponding Japanese Patent Application No. 2019-158772, dated Jun. 6, 2023.

(Continued)

*Primary Examiner* — Sophia S Chen
(74) *Attorney, Agent, or Firm* — Merchant & Gould P.C.

(57) ABSTRACT

A drum cartridge includes: a photosensitive drum rotatable about an axis extending in a first direction; a first drum frame to which a developing cartridge is attachable; and a second drum frame having an outer surface; and a memory having an electrical contact surface. The first drum frame is at one end portion of the drum cartridge in a second direction and the second drum frame is at another end portion of the drum cartridge in the second direction. The electrical contact surface is positioned at the outer surface of the second drum frame and is movable in a predetermined direction relative to the second drum frame.

10 Claims, 7 Drawing Sheets

Related U.S. Application Data continuation of application No. 17/002,037, filed on Aug. 25, 2020, now Pat. No. 11,112,755.

(51) Int. Cl.
*G03G 15/08* (2006.01)
*G03G 21/16* (2006.01)

(52) U.S. Cl.
CPC ..... *G03G 21/1676* (2013.01); *G03G 21/1814* (2013.01); *G03G 21/1821* (2013.01); *G03G 21/1885* (2013.01)

(58) Field of Classification Search
CPC ........... G03G 21/1821; G03G 21/1867; G03G 21/1875; G03G 21/1878; G03G 21/1885; G03G 2221/166; G03G 2221/1823
See application file for complete search history.

(56) References Cited

U.S. PATENT DOCUMENTS

2003/0215257 A1 11/2003 Karakama et al.
2006/0285132 A1 12/2006 Kwon
2007/0009281 A1 1/2007 Sato et al.
2007/0264043 A1 11/2007 Miller
2013/0051849 A1 2/2013 Itabashi et al.
2015/0153706 A1 6/2015 Tani et al.
2018/0095420 A1 4/2018 Abe
2018/0314202 A1 11/2018 Yokoi
2019/0171158 A1 6/2019 Shao et al.
2019/0278221 A1 9/2019 Saeki
2019/0391529 A1 12/2019 Abe et al.
2020/0096938 A1 3/2020 Endo
2020/0209780 A1 7/2020 Hamada et al.
2020/0241461 A1 7/2020 Zhang et al.
2020/0310339 A1 10/2020 Yokoi et al.

FOREIGN PATENT DOCUMENTS

JP 2004-294950 A 10/2004
JP 2013-54058 A 3/2013
JP 2018-146829 A 9/2018
JP 2018-146830 A 9/2018
JP 2018-189740 A 11/2018

OTHER PUBLICATIONS

Decision of Refusal issued to corresponding Japanese Patent Application No. 2019-158772, dated Nov. 7, 2023.

* cited by examiner

DRUM CARTRIDGE INCLUDING MOVABLE ELECTRICAL CONTACT SURFACE, AND IMAGE-FORMING APPARATUS USING THE SAME

CROSS REFERENCE TO RELATED APPLICATION

This application is a continuation of U.S. patent application Ser. No. 17/464,347, filed Sep. 1, 2021, now U.S. Pat. No. 11,609,536, which is a continuation of U.S. patent application Ser. No. 17/002,037, filed Aug. 25, 2020, now U.S. Pat. No. 11,112,755, which claims priority from Japanese Patent Application No. 2019-158772 filed Aug. 30, 2019. The entire content of the priority applications is incorporated herein by reference.

TECHNICAL FIELD

The present disclosure relates to a drum cartridge and an image-forming apparatus.

BACKGROUND

There has been known an electro-photographic type image-forming apparatus such as a laser printer and an LED printer. One of such a type of image-forming apparatus includes: a main body; a drum cartridge including a photosensitive drum and attachable to and detachable from the main body; and a laser scanner or an LED scanner configured to irradiate light on a basis of an image signal to the photosensitive drum.

In the above image-forming apparatus, an IC chip storing therein various information on the drum cartridge is provided on an exposed outer surface of the drum cartridge. The IC chip has an electrical contact surface. The electrical contact surface contacts an electrical terminal of the main body upon attachment of the drum cartridge to the main body. As a result, in the image-forming apparatus, data reading from the IC chip and data writing in the IC chip can be performed.

SUMMARY

The drum cartridge attached to the main body may move relative to the main body during a printing operation. According to the above-described conventional art, the electrical contact surface also moves along with the movement of the drum cartridge, since the electrical contact surface is fixed to the outer surface of the drum cartridge. As a result, positional relationship between the electrical terminal of the main body and the electrical contact surface is changed. Hence, in a case where the electrical contact surface moves along with the movement of the drum cartridge, relative sliding motion may occur between the electrical terminal of the main body and the electrical contact surface. Consequently, rubbing may occur on the electrical contact surface, which may lead to unstable electrical connection between the electrical contact surface and the electrical terminal.

In view of the foregoing, it is an object of the disclosure to provide a technology capable of effectively securing electrical connection between the electrical contact surface of the drum cartridge and the electrical terminal of the main body, while achieving reduction in size of the electrical contact surface of the drum cartridge.

In order to attain the above and other objects, according to one aspect, the disclosure provides a drum cartridge including a photosensitive drum, a first drum frame, a second drum frame, and a memory. The photosensitive drum is rotatable about an axis extending in a first direction. A developing cartridge is attachable to the first drum frame. The second drum frame has an outer surface. The first drum frame is at one end portion of the drum cartridge in a second direction, and the second drum frame is at another end portion of the drum cartridge in the second direction. The memory has an electrical contact surface. The electrical contact surface is positioned at the outer surface and is movable in a predetermined direction relative to the second drum frame.

According to another aspect, the disclosure also provides an image-forming apparatus including the above-described drum cartridge, and a main body to which the drum cartridge is attachable. The main body includes an electrical terminal configured to contact the electrical contact surface in an attached state of the drum cartridge to the main body.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Figure 1:
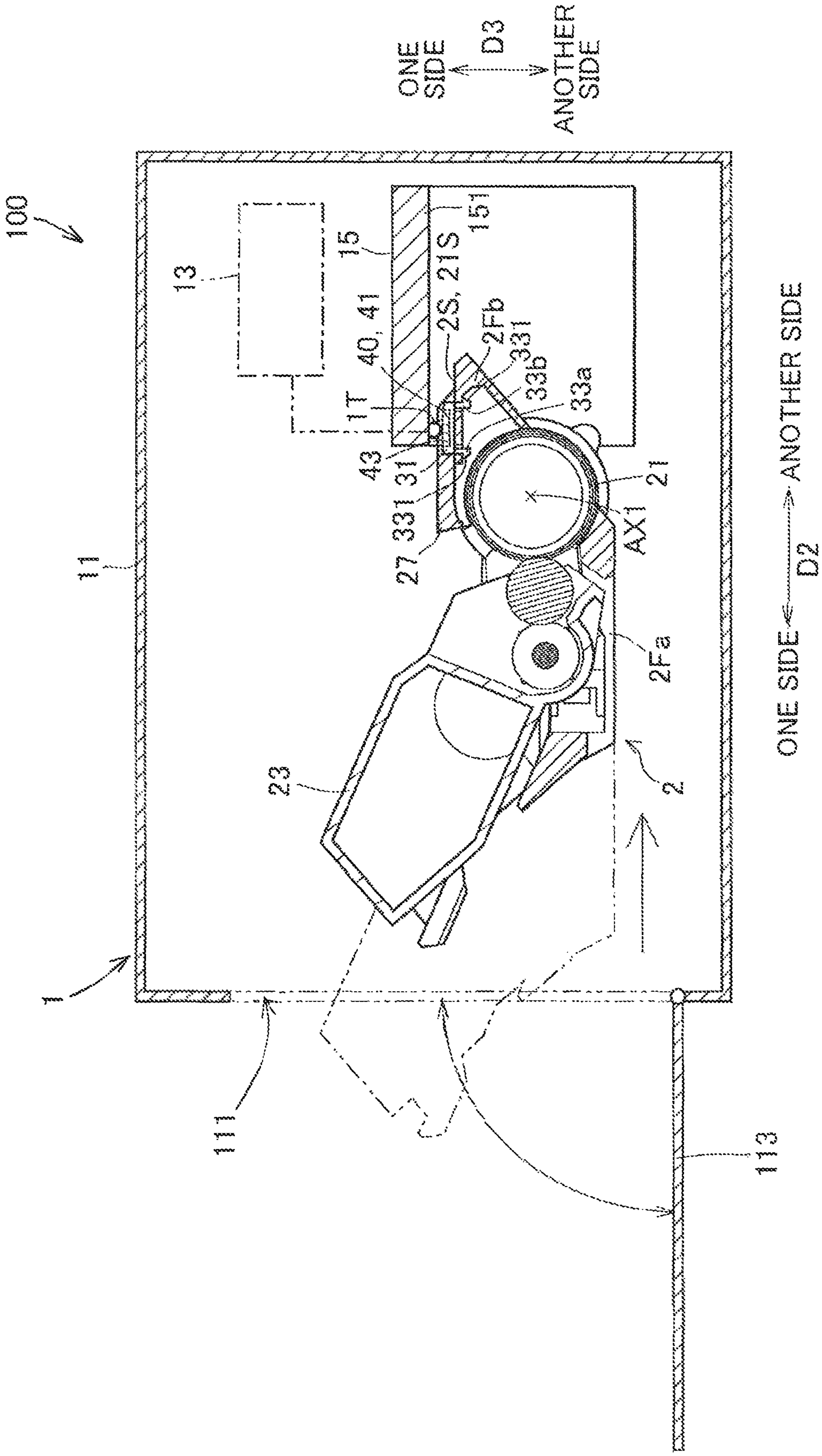
FIG. 1 is a schematic view of an image-forming apparatus according to a first embodiment.

Hereinafter, embodiments of the present disclosure will be described with reference to accompanying drawings. It should be noted that elements described in the embodiments are merely exemplary and the scope of the disclosure should not be confined to those described therein. In the drawings, dimensions and numbers of some elements may be simplified in order to facilitate understanding.

In each drawing, for the sake of convenience, a first direction D1, a second direction D2, and a third direction D3 are defined for description of a structure of a drum cartridge 2. The first direction D1 is coincident with an extending direction of a rotation axis (drum axis) AX1 of a photosensitive drum 21 described later. The second direction D2 crosses the first direction D1, and is perpendicular to the first direction in the embodiments. The third direction D3 crosses the first direction D1 and the second direction D2, and is perpendicular to the first direction D1 and the second direction D2 in the embodiments.

1. First Embodiment

<Image-Forming Apparatus 100>

FIG. 1 is a schematic view of an image-forming apparatus 100 according to a first embodiment of the present disclosure. The image-forming apparatus 100 is an electro-photographic type printer, such as a laser printer and an LED printer, for example. As illustrated in FIG. 1, the image-forming apparatus 100 includes a main body 1, and the drum cartridge 2.

<Main Body 1>

The main body 1 includes a housing 11 and a controller 13. The housing 11 has an opening 111, and includes a cover 113 for opening and closing the opening 111. The drum cartridge 2 is attached to an interior of the housing 11 through the opening 111 while the cover 113 is open. Specifically, the drum cartridge 2 is attached to the main body 1 by moving the drum cartridge 2 in the second direction D2 toward another side relative to the main body 1. In the following description, a state where the drum cartridge 2 is attached to the main body 1 will be occasionally referred to as an "attached state."

The controller 13 is positioned inside the housing 11. The controller 13 includes a CPU and a memory those not illustrated. The CPU is configured to execute programs stored in the memory. Hence, the controller 13 performs various processing. For example, the controller 13 can read various data from a memory 41 (described later) of the drum cartridge 2. Incidentally, the controller 13 may include a hardware designed for specific use such an application specific integrated circuits (ASIC) to exhibit various functions.

<Drum Cartridge 2>

Figure 2:
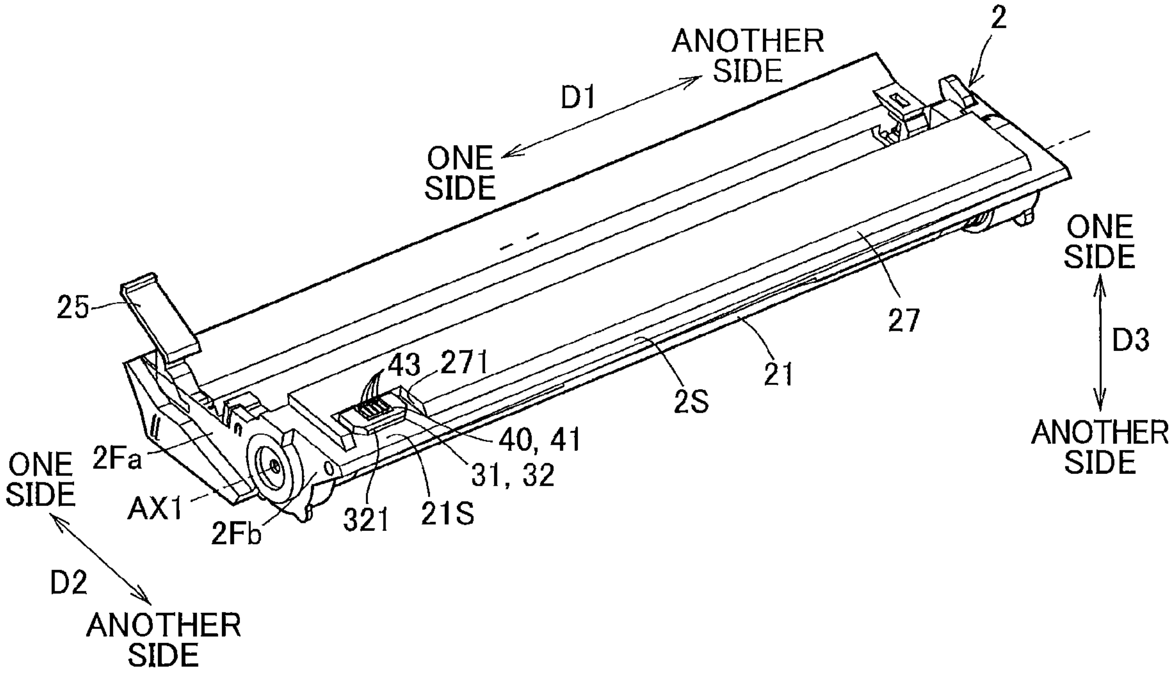
FIG. 2 is a perspective view of a drum cartridge according to the first embodiment.
Figure 3:
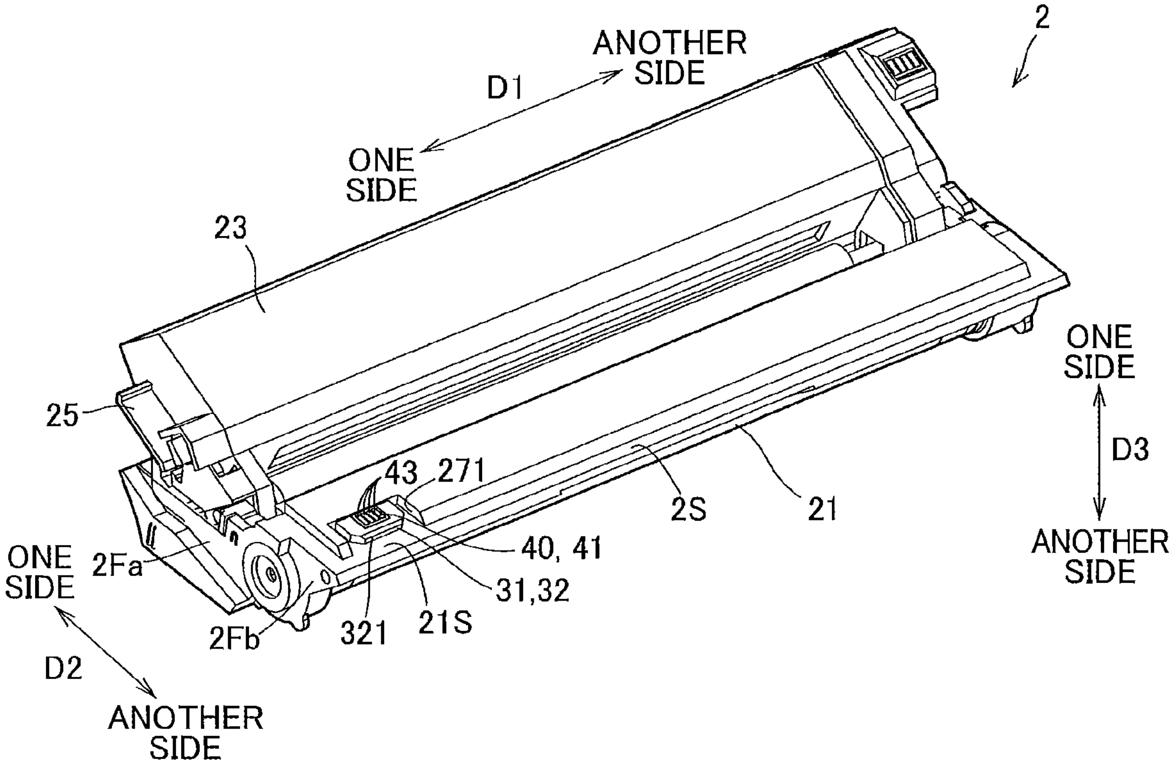
FIG. 3 is a perspective view of the drum cartridge according to the first embodiment to which a developing cartridge is attached.
Figure 4:
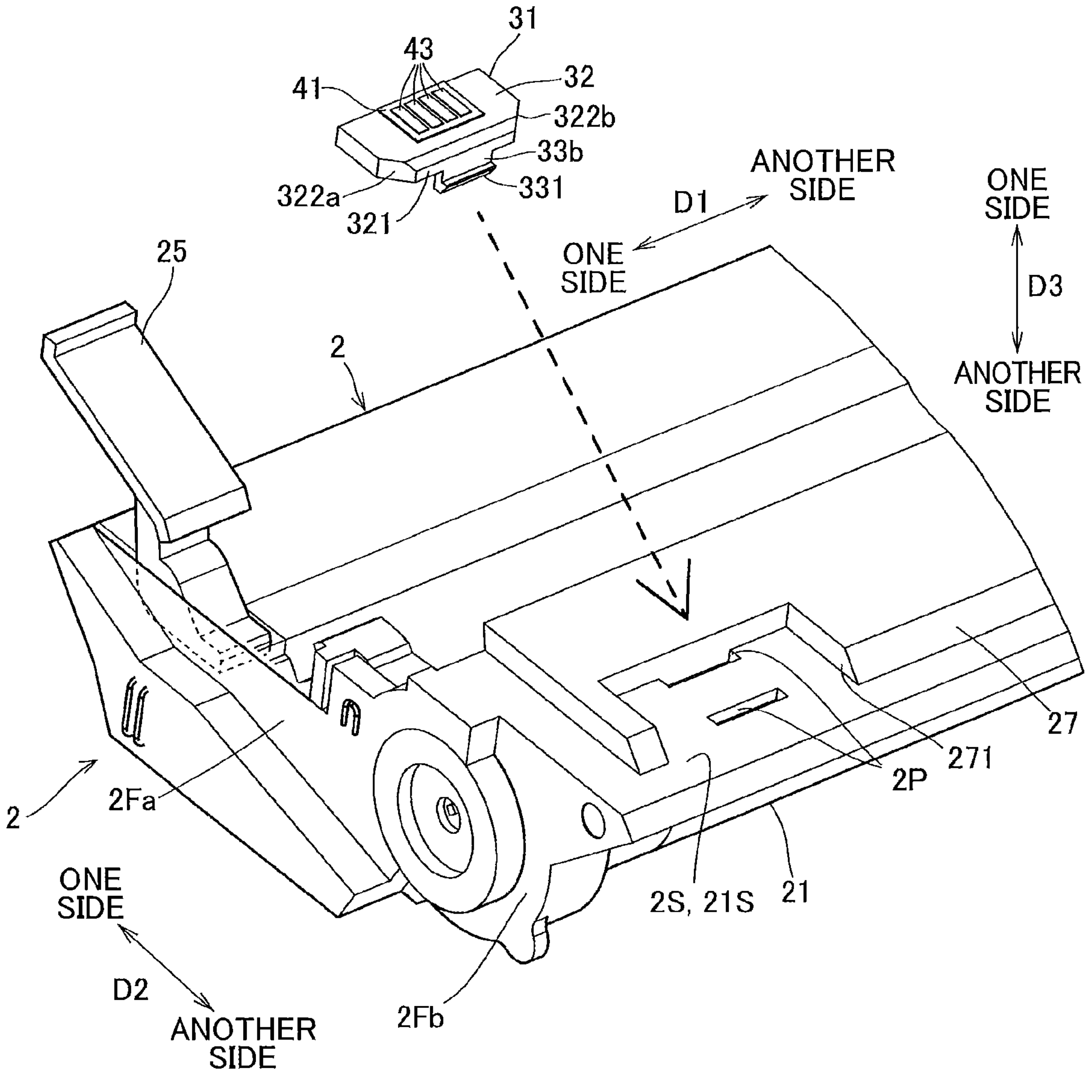
FIG. 4 is an enlarged perspective view illustrating a part of the drum cartridge according to the first embodiment.

FIG. 2 is a perspective view of the drum cartridge 2 according to the first embodiment. FIG. 3 is a perspective view of the drum cartridge 2 to which a developing cartridge 23 is attached. FIG. 4 is an enlarged perspective view illustrating a portion of the drum cartridge 2.

The drum cartridge 2 includes the photosensitive drum 21, a first drum frame 2Fa, a second drum frame 2Fb, a holder 31, and the memory 41. The photosensitive drum 21 is rotatable about the rotation axis AX1 (FIG. 2) extending in the first direction D1. The developing cartridge 23 including a developing roller is attachable to the drum cartridge 2. Incidentally, the developing roller is not essentially required in the developing cartridge 23, but the developing roller may be provided in the drum cartridge 2.

<First Drum Frame 2Fa>

The first drum frame 2Fa is positioned at one end portion of the drum cartridge 2 at one side in the second direction D2. The developing cartridge 23 is attached to a surface of one end portion of the first drum frame 2Fa at one side in the third direction D3.

<Second Drum Frame 2Fb >

The second drum frame 2Fb is positioned at another end portion of the drum cartridge 2 at the another side in the second direction D2. The second drum frame 2Fb has an outer surface 2S exposed to an outside. The second drum frame 2Fb has a flat surface 21S positioned further toward one side in the third direction D3 than the photosensitive drum 21. The flat surface 21S is a part of the outer surface 2S of the second drum frame 2Fb.

The first drum frame 2Fa and the second drum frame 2Fb may be integrally formed as a single member. Alternatively, the first drum frame 2Fa and the second drum frame 2Fb may be separate members and be connected to each other.

The drum cartridge 2 further includes a lock lever 25. The lock lever 25 is positioned at one end portion of the first drum frame 2Fa at the one side in the first direction. The lock lever 25 is pivotally movable about an axis extending in parallel to the first direction D1. The developing cartridge 23 is fixed to or released from the drum cartridge 2 by the pivotal movement of the lock lever 25.

The drum cartridge 2 further includes a first member 27. The first member 27 is positioned on the flat surface 21S of the second drum frame 2Fb. The first member 27 is a rectangular plate-shaped member extending in the first direction D1. The first member 27 has a recessed portion 271. The recessed portion 271 is positioned at one end portion of the first member 27 at the one side in the first direction D1. Further, the recessed portion 271 is positioned at an end portion of the first member 27 at the another side in the second direction D2. The holder 31 is positioned inside the recessed portion 271.

<Holder 31>

The holder 31 is attached to the flat surface 21S of the second drum frame 2Fb. The holder 31 is positioned at one end portion of the flat surface 21S at the one side in the first direction D1. Further, the holder 31 is positioned further toward the another side in the second direction D2 than the rotation axis AX1 of the photosensitive drum 21 (see FIG. 1).

The holder 31 includes a holder body 32, and two hooks 33*a* and 33*b* (see FIG. 1). The holder body 32 has a plate shape. As illustrated in FIG. 4, the holder body 32 has one end portion 321 at the another side in the second direction D2. The end portion 321 has a width in the first direction D1 that is gradually reduced toward the another side in the second direction D2. Specifically, in the present embodiment, a first corner portion 322*a* of the end portion 321 at the one side in the first direction D1, and a second corner portion 322*b* of the end portion 321 at the another side in the first direction D1 are respectively inclined inward.

Further, the end portion 321 has a surface at the one side in the third direction D3. This surface is sloped toward the another side in the third direction D3 as extending toward the another side in the second direction D2. Hence, a thickness of the end portion 321 in the third direction D3 is gradually reduced toward the another side in the second direction D2.

<Hooks 33*a* and 33*b*>

The hooks 33*a*, 33*b* protrude from the holder body 32 toward the another side in the third direction D3. The hook 33*a* is positioned at one end portion of the holder body 32 in the second direction D2, and the hook 33*b* is positioned at another end portion of the holder body 32 in the second direction D2 (see FIG. 1). The hooks 33*a* and 33*b* extend in the first direction D1.

<Slots 2P>

As illustrated in FIG. 4, two slots 2P are open at the outer surface 2S of the second drum frame 2Fb. Further, the two slots 2P are positioned inside the recessed portion 271 of the first member 27. Each slot 2P constitutes a through-hole extending from the outer surface 2S of the second drum frame 2Fb and throughout a thickness of the second drum frame 2Fb toward the another side in the third direction D3. The hooks 33*a* and 33*b* penetrate through the hooks 2P and 2P, respectively.

As illustrated in FIGS. 1 and 4, the hook 33*a* has a tip end portion 331 protruding toward the one side in the second direction D2. The hook 33*b* has a tip end portion 331 protruding toward the another side end in the second direction D2. These tip end portions 331 engage with an inner surface of the second drum frame 2Fb at a deeper side of the respective slots 2P (at the another side in the third direction D3). The hooks 33*a* and 33*b* and the holder body 32 are thus prevented from coming off the second drum frame 2Fb.

Each slot 2P has a length in the first direction D1 that is greater than a length in the first direction D1 of the hook 33*a* (33*b*). Each of the hooks 33*a* and 33*b* inserted in one of the slots 2P is movable in the first direction D1 relative to the slot 2P, while being restricted from moving in the second direction D2 relative to the slot 2P. Hence, the holder 31 is movable in the first direction D1 relative to the second drum frame 2Fb.

An IC chip 40 is attached to the holder 31. Specifically, the IC chip 40 is attached to one end surface of the holder body 32 at the one side in the third direction D3. The memory 41 is mounted in the IC chip 40 as a part of the IC chip 40.

<Electrical Contact Surface 43>

The IC chip 40 has one surface at the one side in the third direction D3 where a plurality of (four) electrical contact surfaces 43 is provided. The electrical contact surfaces 43 are arrayed with one another in the first direction D1 (see FIG. 4). Incidentally, the direction of the array of the electrical contact surfaces 43 is not limited to the first direction D1, but may be the second direction D2.

The electrical contact surfaces 43 are membranes made from electrically conductive metal such as copper and gold. A part of the plurality of electrical contact surfaces 43 is electrically connected to the memory 41, and a remaining part of the plurality of electrical contact surfaces 43 is electrically connected to a circuit of the IC chip 40 other than the memory 41.

In the present embodiment, the memory 41 having the electrical contact surfaces 43 is attached to the holder 31, and, hence, the electrical contact surfaces 43 are held by the holder 31. Hence, each of the electrical contact surfaces 43 is movable in the first direction D1 relative to the second drum frame 2Fb, along with the holder 31.

The holder 31 is positioned at one end portion of the flat surface 21S of the second drum frame 2Fb at the one side in the first direction D1. Hence, the electrical contact surfaces 43 are also positioned at the one end portion of flat surface 21S at the one side in the first direction D1. The electrical contact surfaces 43 are positioned at the same side as the as the lock lever 25 (at the one side in the first direction D1) in the drum cartridge 2.

<Main Frame 15>

Figure 5:
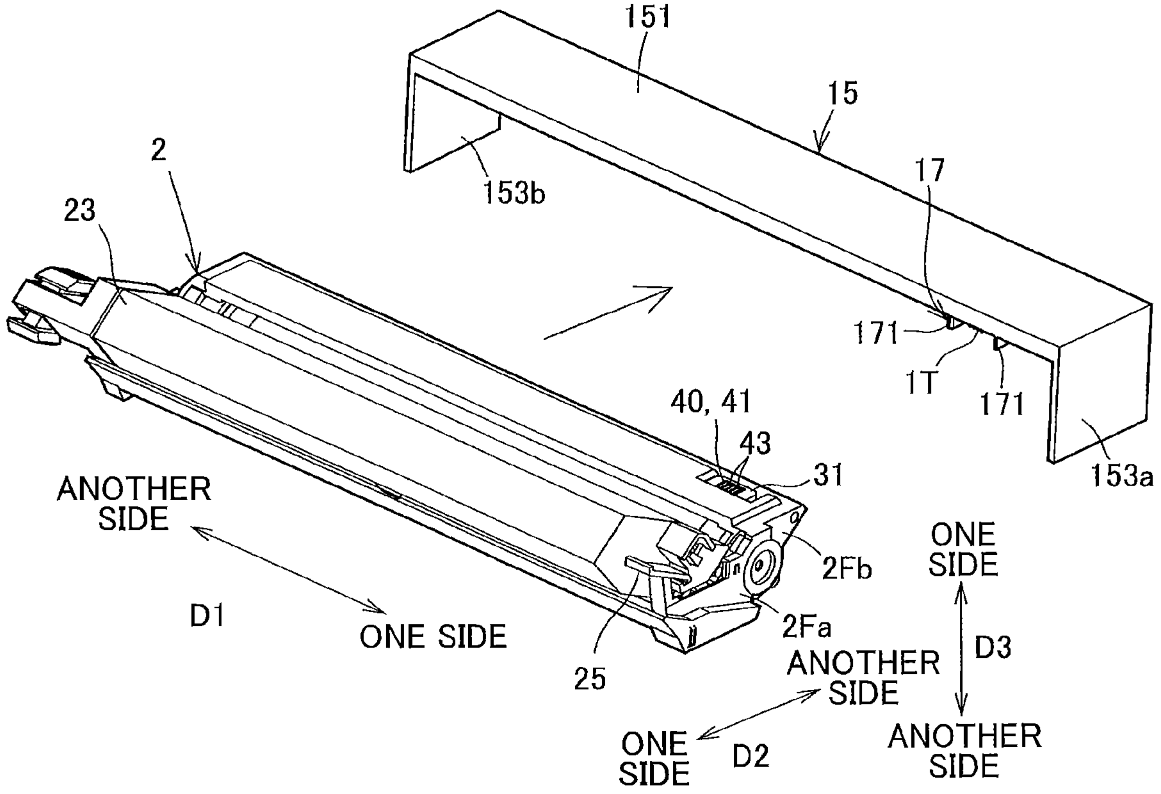
FIG. 5 is a perspective view of the drum cartridge and a main frame according to the first embodiment.

As illustrated in FIG. 1, a main frame 15 is provided inside the housing 11 of the image-forming apparatus 100. FIG. 5 is a perspective view of the main frame 15 and the drum cartridge 2. As illustrated in FIG. 5, the main frame 15 includes a body frame portion 151 extending in the first direction D1, a first side wall portion 153*a*, and a second side wall portion 153*b*. The first side wall portion 153*a* extends in the third direction D3 toward the another side from one end portion of the body frame portion 151 in the first direction D1. The second side wall portion 153*b* extends in the third direction D3 toward the another side from another end portion of the body frame portion 151 at the another side in the first direction D1.

The body frame portion 151 includes a contact portion 17. The contact portion 17 is positioned at one end portion of the body frame portion 151 at the one side in the first direction D1. The contact portion 17 includes a pair of side plates 171, 171, and four electrical terminals 1T.

The pair of side plates 171 and 171 are spaced away from each other in the first direction D1 to face each other in the first direction D1. The side plates 171 and 171 provide a gap distance therebetween that is approximately equal to or slightly greater than a width of the holder 31 in the first direction D1. The four electrical terminals 1T are arrayed with one another in the first direction D1 between the pair of side plates 171 and 171. Each electrical terminal 1T is made from electrically conductive material and is electrically connected to the controller 13. As illustrated in FIG. 1, in the attached state, each electrical terminal 1T is in contact with corresponding one of the electric contact surfaces 43. Hence, the controller 13 and the IC chip 40 are electrically connected to each other.

<Connection Between Electrical Terminal 1T and Electrical Contact Surface 43>

Figure 6:
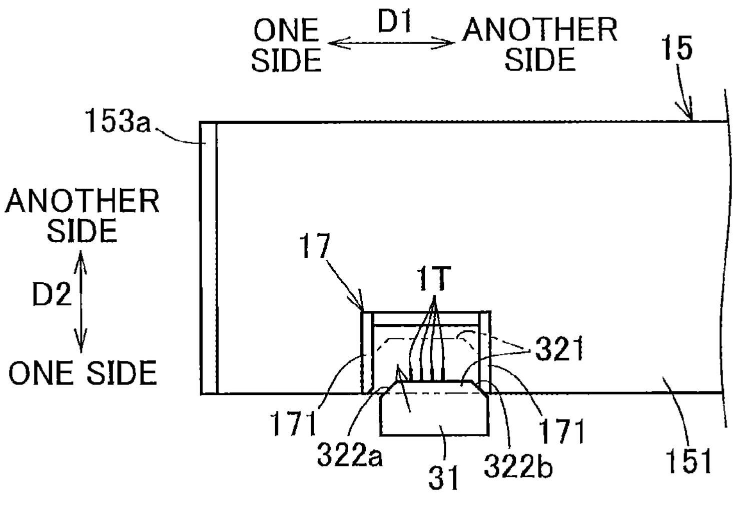
FIG. 6 is a schematic view illustrating a holder which is being guided to an inside of a contact portion.

Next, attachment of the drum cartridge 2 to the main body 1 will be described with reference to FIGS. 5 and 6. FIG. 6 is a view conceptually illustrating the holder 31 to be guided inside the contact portion 17. FIG. 6 illustrates a surface of the main frame 15 at the another side in the third direction D3.

As illustrated in FIG. 5, the holder 31 approaches the main frame 15 provided at the housing 11, as the drum cartridge 2 moves toward the another side in the second direction D2. As illustrated in FIG. 6, and as described above, in the holder 31, the first corner portion 322*a* at the one side of the end portion 321 in the first direction D1 and the second corner portion 322*b* at the another side of the end portion 321 in the first direction D1 are inclined inward. Therefore, as the holder 31 approaches the main frame 15, one of the first and second corner portions 322*a* and 322*b* is brought into contact with one of the pair of side plates 171 and 171. As a result of further movement of the drum cartridge 2 in the second direction D2 toward the another side, the holder 31 moves in the first direction D1 relative to the second drum frame 2Fb, and is guided to a position between the pair of side plates 171 and 171 in the first direction D1. Consequently, each electrical contact surface 43 held by the holder 31 is brought into contact with the corresponding one of the electrical terminals 1T.

In the attached state, the electrical contact surfaces 43 face the one side in the third direction D3, and the electrical terminals 1T contact the respective electrical contact surfaces 43 from the one side in the third direction D3. Each electrical terminal 1T has an annular shape, and is resiliently deformable (see FIG. 1). Therefore, upon contact of the electrical terminal 1T with the corresponding electrical contact surface 43, the electrical terminal 1T presses the electrical contact surface 43, and hence presses the holder 31 in the third direction D3 toward the another side with an appropriate force.

Figure 7A:
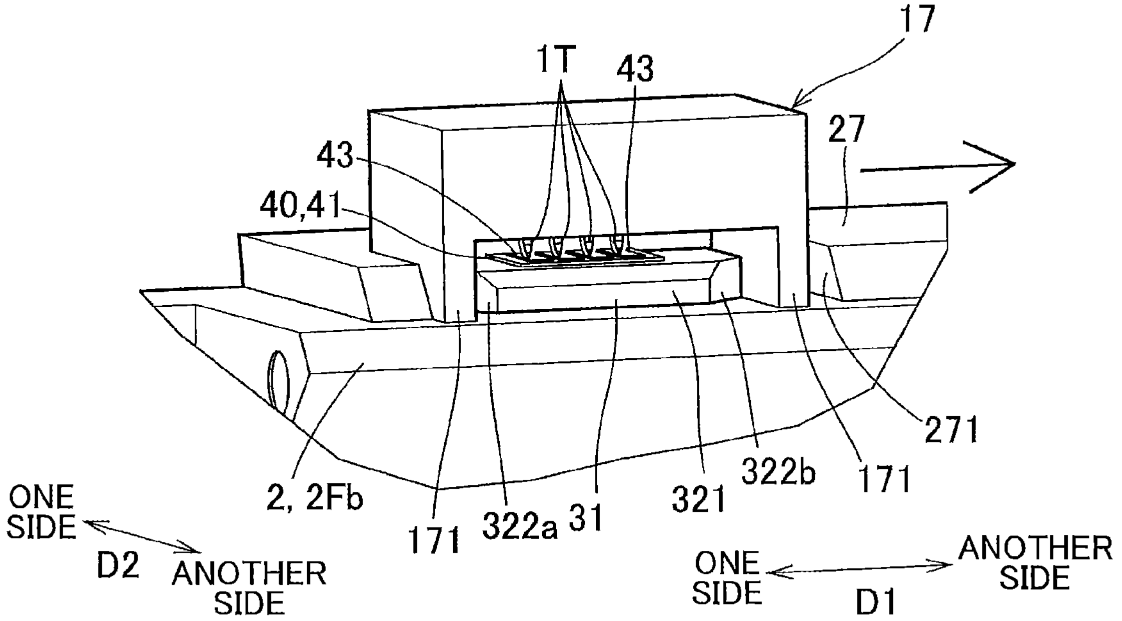
FIGS. 7A and 7B are perspective views for description of a connection between an electrical terminal and an electric contact surface in an attached state of the drum cartridge.
Figure 7B:
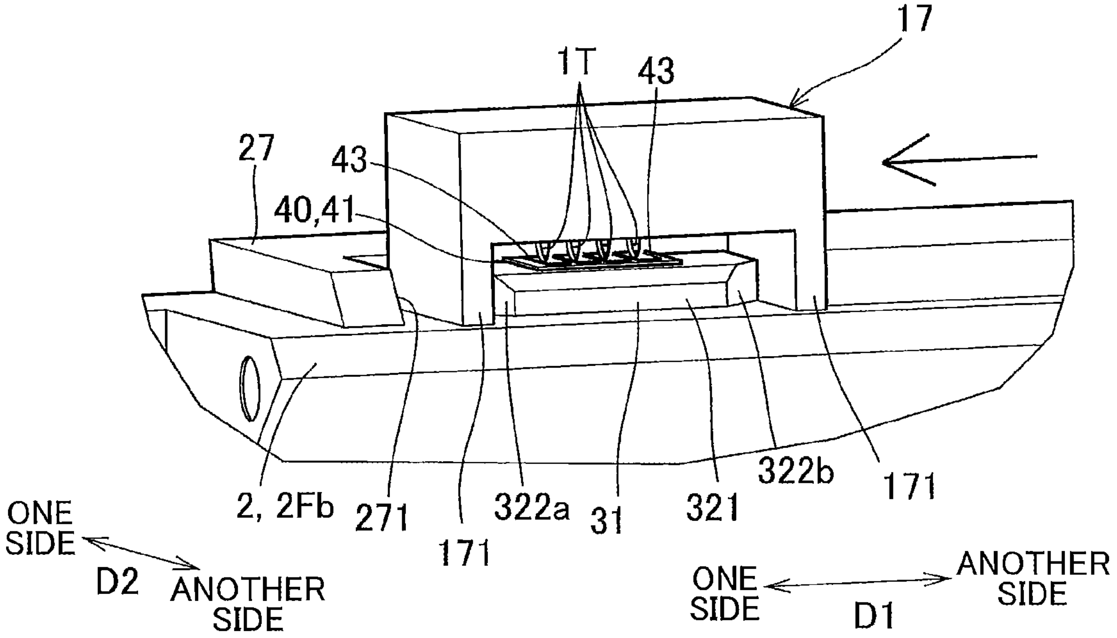

FIGS. 7A and 7B are perspective views respectively illustrating the connection between the electrical terminals 1T and electrical contact surfaces 43 in the attached state. FIG. 7A illustrates a case where the drum cartridge 2 moves toward the another side in the first direction D1, while FIG. 7B illustrates a case where the drum cartridge 2 moves toward the one side in the first direction D1.

Occasionally, in the attached state, the drum cartridge 2 may move in the first direction D1 relative to the main body 1 in a case where the photosensitive drum 21 is driven to perform a printing operation. As illustrated in FIG. 7A, in a case where the drum cartridge 2 moves relative to the main body 1 in the first direction D1 toward the another side, there is a risk of disconnection of the electrical terminals 1T from the electrical contact surfaces 43 if the holder 31 moves in the first direction D1 toward the another side together with the drum cartridge 2.

In contrast, the holder 31 according to the present embodiment is movable in the first direction D1 relative to the second drum frame 2Fb. Therefore, the holder 31 can be restrained from moving together with the drum cartridge 2 in the first direction D1 toward the another side due to the pressing force applied to the holder 31 from the electrical terminals 1T. Accordingly, the connection between the electrical terminals 1T and the electrical contact surfaces 43 can be maintained. The same is true with respect to a case illustrated in FIG. 7B where the drum cartridge 2 moves relative to the main body 1 in the first direction D1 toward the one side.

In this way, in the drum cartridge 2 according to the present embodiment, the connection between the electrical terminals 1T and the electrical contact surfaces 43 held by the holder 31 can be effectively maintained in spite of the movement of the drum cartridge 2 in the first direction D1 relative to the main body 1. Hence, electrical connection between the electrical terminals 1T and the electrical contact surfaces 43 can be secured, even with a reduction in a width of each electrical contact surface 43 in the first direction D1.

Further, because the holder 31 is movable in the first direction D1 relative to the second drum frame 2Fb, sliding movement of the electrical terminals 1T over the electrical contact surfaces 43 can be restrained. This configuration can reduce frictional wearing of the electrical contact surfaces 43, and, hence, the electrical connection between the electrical terminals 1T and the electrical contact surfaces 43 can be effectively secured.

Incidentally, in the case where the drum cartridge 2 moves relative to the main body 1 in the first direction D1 toward the another side as illustrated in FIG. 7A, an inner surface of the recessed portion 271 abuts against the side plate 171 positioned at the one side in the first direction D1. This abutment prevents the drum cartridge 2 from further moving in the first direction D1 toward the another side relative to the main body 1. Similarly, in the case where the drum cartridge 2 moves relative to the main body 1 in the first direction D1 toward the one side as illustrated in FIG. 7B, the inner surface of the recessed portion 271 abuts against the other side plate 171 positioned at the another side in the first direction D1. The abutment prevents the drum cartridge 2 from further moving in the first direction D1 toward the one side relative to the main body 1.

2. Second Embodiment

Next, a second embodiment of the disclosure will be described with reference to FIGS. 8 and 9, wherein like parts and components are designated by the same reference numerals as those shown in FIGS. 1 through 7B to avoid duplicating description.

Figure 8:
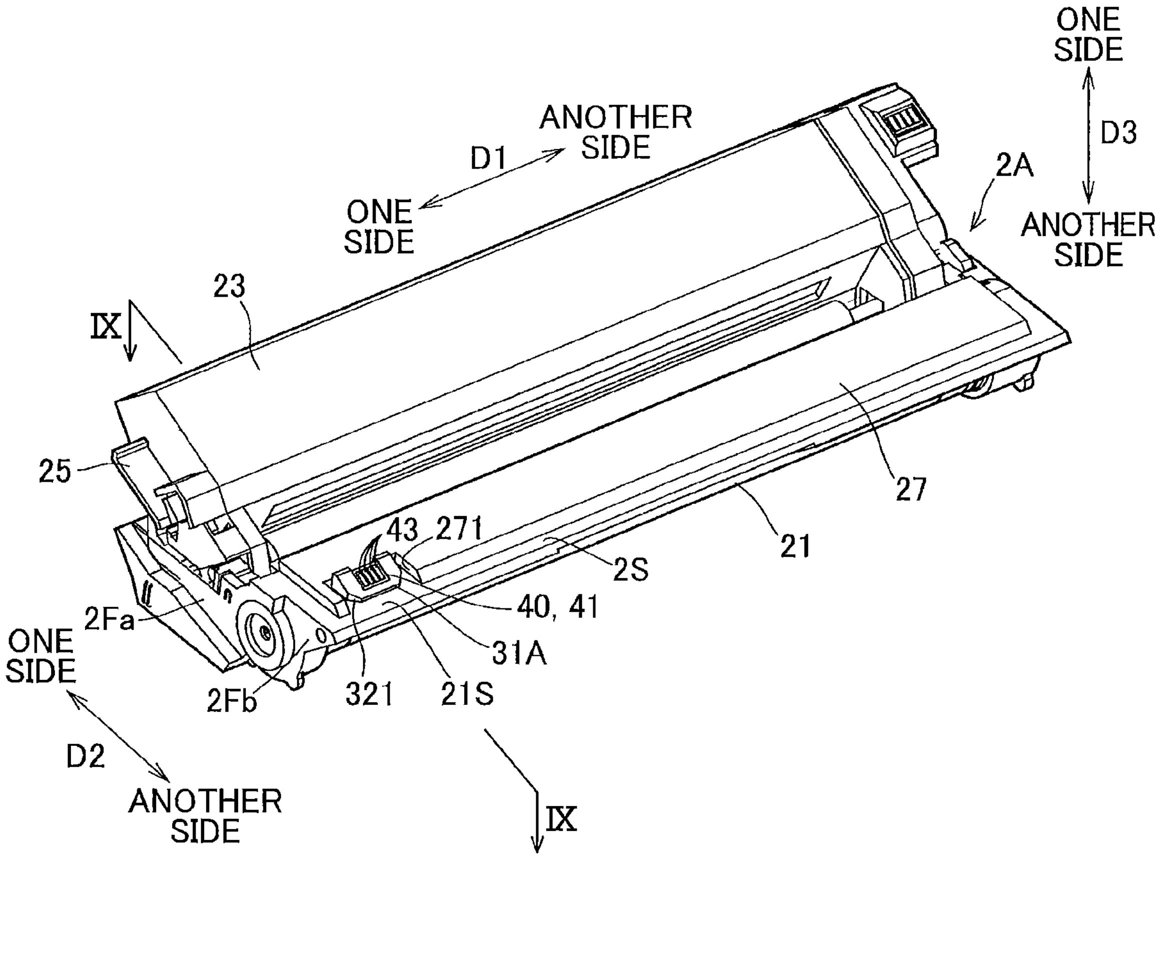
FIG. 8 is a schematic view of a drum cartridge according to a second embodiment.

FIG. 8 is a perspective view of a drum cartridge 2A according to the second embodiment. FIG. 9 is a cross-sectional view of the drum cartridge 2A to be attached to the main body 1. As illustrated in FIG. 8, the drum cartridge 2A according to the second embodiment is different from the drum cartridge 2 according to the first embodiment in that the drum cartridge 2A includes a holder 31A instead of the holder 31.

The holder 31A has one surface at the one side in the third direction D3, the one surface being a sloped surface sloping toward the another side in the third direction D3 as extending toward the another side in the second direction D2. On this sloped surface, the IC chip 40 is positioned. Accordingly, in the second embodiment, the plurality of electrical contact surfaces 43 are sloped toward the another side in the third direction D3 as extending toward the another side in the second direction D2.

Figure 9:
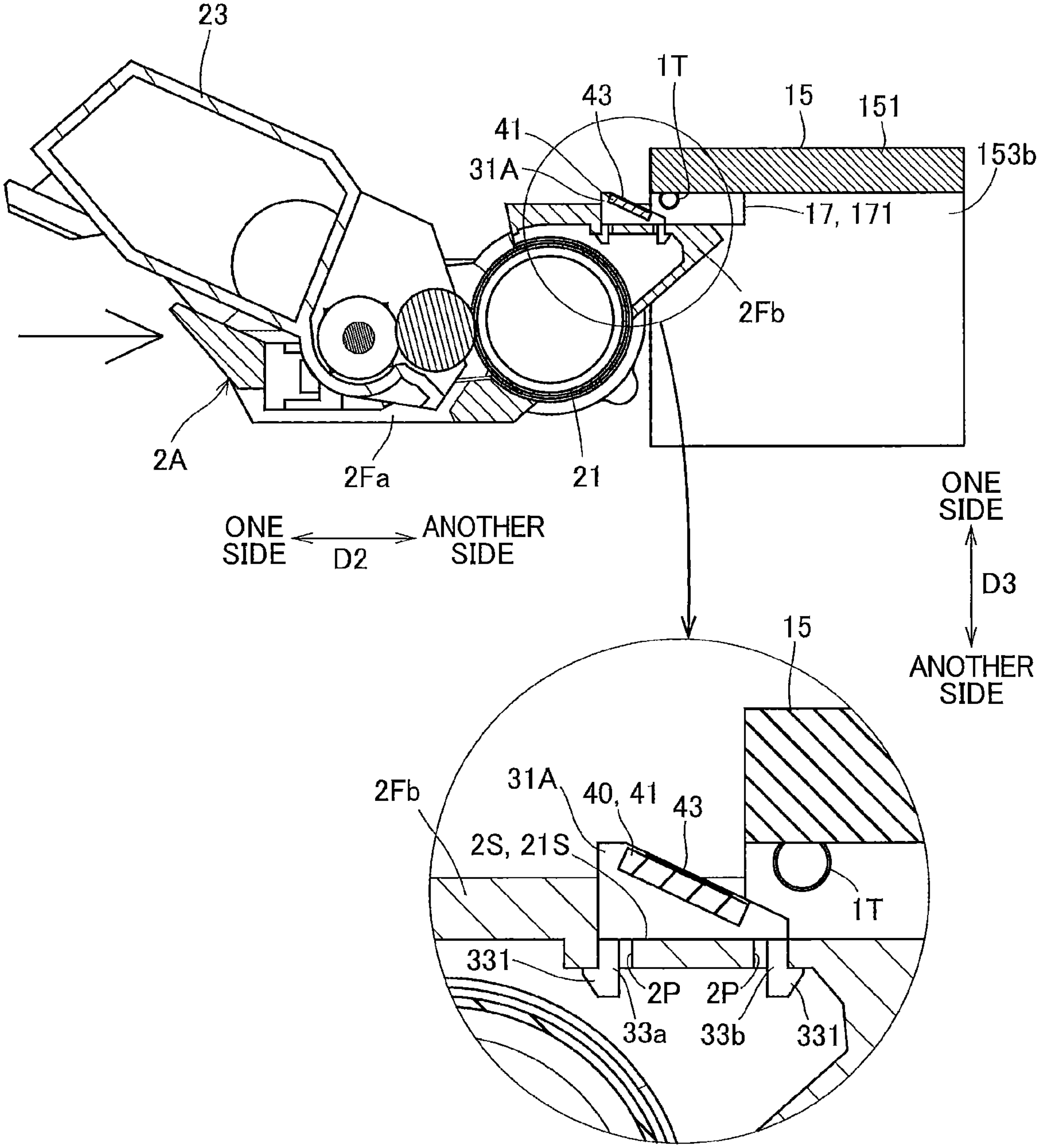
FIG. 9 is a cross-sectional view of the drum cartridge according to the second embodiment in an attached state taken along a line IX-IX in FIG. 8.

As illustrated in FIG. 9, in accordance with the movement of the drum cartridge 2A in the second direction D2 toward the another side inside the housing 11 of the main body 1, the sloped electrical contact surfaces 43 are brought into contact with the electrical terminals 1T positioned at the another side in the second direction D2 relative to the holder 31A. Hence, in the attached state, the electrical terminals 1T and the electrical contact surfaces 43 are in pressure contact with each other in the second direction D2 and the third direction D3. Accordingly, in the attached state, movement of the holder 31A together with the drum cartridge 2A in the first direction D1 can be restrained by the pressing force applied to the holder 31A from the electrical terminals 1T in spite of the movement of the drum cartridge 2A in the first direction D1 relative to the main body 1. Accordingly, the electrical connection between the electrical terminals 1T and the electrical contact surfaces 43 can be stably maintained.

3. Modifications

In the above-described embodiments, the electrical contact surfaces 43 are movable in the first direction D1 relative to the second drum frame 2Fb. However, the electrical contact surfaces 34 may be movable in a direction crossing the first direction D1, for example, the second direction D2, relative to the second drum frame 2Fb.

While the description has been made in detail with reference to the specific embodiments and modifications, it would be apparent to those skilled in the art that various changes and modifications may be made without departing from the scope of the disclosure. Parts and components appearing in the above-described embodiments and modifications may be suitably combined or omitted in any way that does not produce inconsistencies.

<Remarks>

The drum cartridges 2, 2A are examples of a drum cartridge. The photosensitive drum 21 is an example of a photosensitive drum. The first drum frame 2Fa is an example of a first drum frame. The second drum frame 2Fb is an example of a second drum frame. The memory 41 is an example of a memory. The electrical contact surfaces 43 are an example of an electrical contact surface. The lock lever 25 is an example of a lock lever. The holder 31 is an example of a holder. The hooks 33*a*, 33*b* are examples of a hook. The slots 2P are an example of a slot. The image-forming apparatus 100 is an example of an image-forming apparatus. The electrical terminals 1T are an example of an electrical terminal.

What is claimed is:

1. A drum cartridge comprising:

a photosensitive drum rotatable about an axis extending in a first direction;

a first drum frame to which a developing cartridge is attachable; and a second drum frame having an outer surface, the first drum frame being at one end portion of the drum cartridge in a second direction and the second drum frame being at another end portion of the drum cartridge in the second direction; and a memory having an electrical contact surface, the electrical contact surface being positioned at the outer surface and movable in a predetermined direction relative to the second drum frame.

2. The drum cartridge according to claim 1, wherein the second direction crosses the first direction.

3. The drum cartridge according to claim 1, wherein the predetermined direction is the first direction.

4. The drum cartridge according to claim 3, wherein the memory comprises a plurality of the electrical contact surfaces arrayed with one another in the first direction.

5. The drum cartridge according to claim 1, wherein the electrical contact surface is positioned at one end portion of the outer surface in the first direction.

6. The drum cartridge according to claim 5, further comprising a lock lever configured to fix the developing cartridge to the first drum frame, the lock lever being positioned at one end portion of the first drum frame in the first direction.

7. The drum cartridge according to claim 6, wherein the second direction crosses the first direction, and wherein a distance between the photosensitive drum and the lock lever is greater than a distance between the photosensitive drum and the electrical contact surface in the second direction.

8. The drum cartridge according to claim 1, wherein the electrical contact surface is positioned at one end portion of the outer surface in a third direction crossing the second direction.

9. The drum cartridge according to claim 1, wherein the electrical contact surface is sloped toward another side in a third direction crossing the second direction as extending toward another side in the second direction.

10. An image-forming apparatus comprising:

the drum cartridge according to claim 1; and a main body to which the drum cartridge is attachable, the main body comprising an electrical terminal configured to contact the electrical contact surface in an attached state of the drum cartridge to the main body.

* * * * *